INVENTOR
LESTER M. SPANDORFER

BY Rene A. Kuypers
ATTORNEY

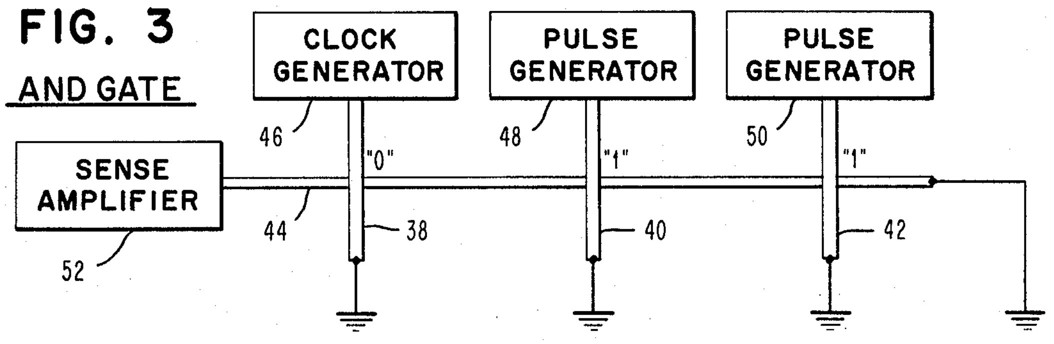
FIG. 3 AND GATE
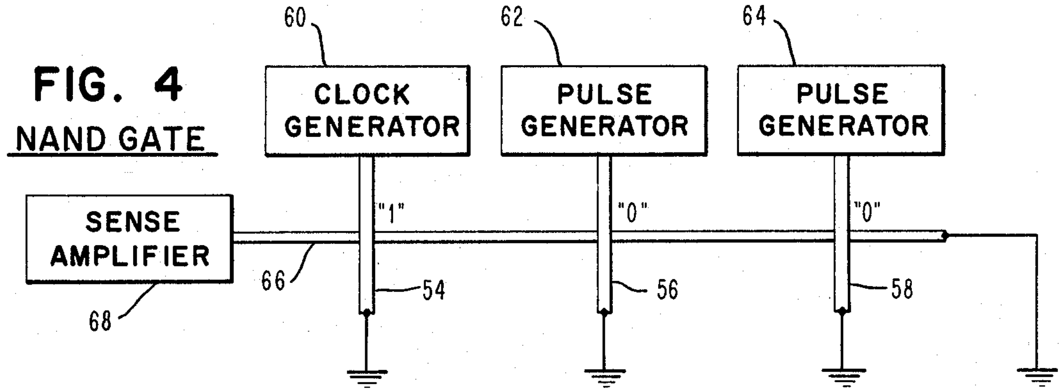
FIG. 4 NAND GATE
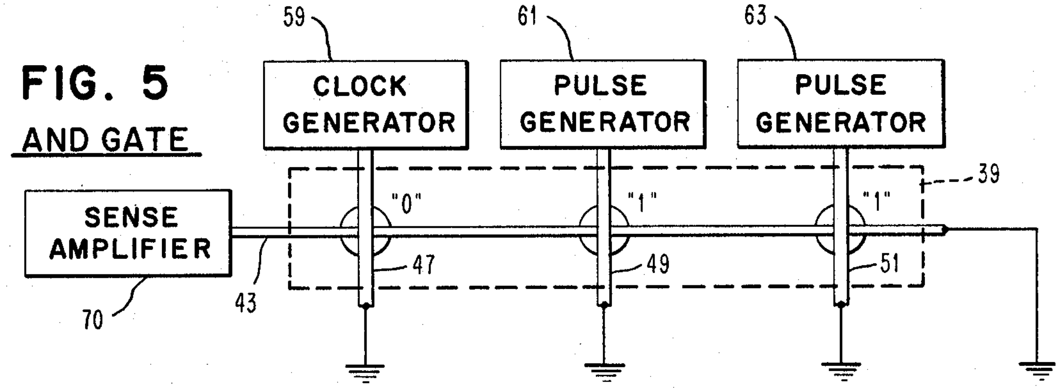
FIG. 5 AND GATE
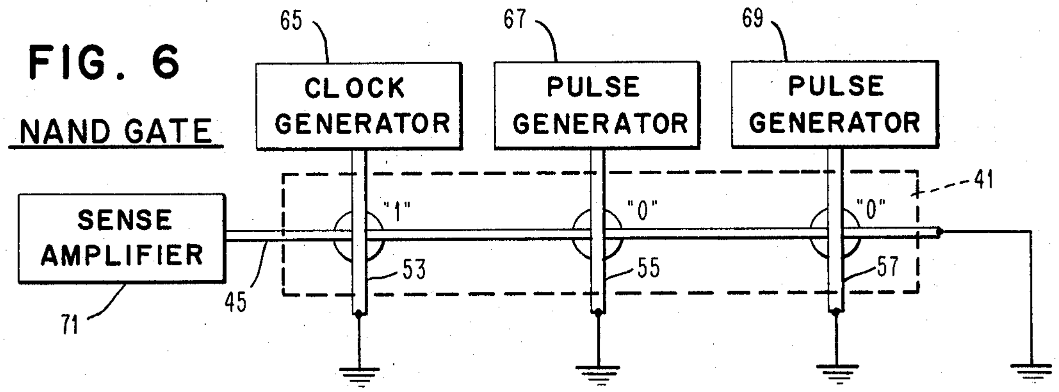
FIG. 6 NAND GATE 3,390,277

LOGICAL DEVICES

Lester M. Spandorfer, Cheltenham, Pa., assignor to Sperry Rand Corporation, New York, N.Y., a corporation of Delaware Filed Jan. 3, 1964, Ser. No. 335,591
10 Claims. (Cl. 307—88)

ABSTRACT OF THE DISCLOSURE

This invention relates to a logical AND gate utilizing one-way transmission devices, which comprise drive lines juxtaposed either to thin film or ferrite core memory elements. The AND gate of this invention may comprise, for example, two binary bits which are permanently magnetized as binary ones with the third bit being magnetized as a binary zero. The energizing means connected to the drive line contiguous to the binary zero bit is connected to a clock generator which is in continuous operation. The remaining two drive lines are connected to conventional pulse generators. When all three drive lines are energized during the same time period, a resultant signal is produced which is detected by a sense amplifier. The resultant signal indicates that the logical AND function has been accomplished. If only one drive line is energized in addition to the line connected to the clock generator no signal is detected by the sense amplifier thereby indicating that the logical AND function is not accomplished.

This invention relates in general to an AND and NAND logical circuit. In particular, this invention relates to an AND and NAND logical circuit, which incorporates a ferrite core, a planar thin film, or a thin film-plated wire one-way transmission device.

Heretofore, prior art AND and NAND gates have generally been fabricated with diodes, which have not proved to be satisfactory because they are not entirely reliable as circuit elements. A further shortcoming of diodes when used as one-way transmission devices in logical circuits is that they are relatively expensive and require elaborate manufacturing techniques because of their complex structure.

It is therefore an object of this invention to provide a new and improved AND gate.

It is also an object of this invention to provide a new and improved NAND gate.

It is a further object of this invention to provide a new and improved AND gate, which incorporates a plurality of ferrite core, thin film-plated wire or planar thin film one-way transmission devices.

It is still a further object of this invention to provide a new and improved NAND gate, which incorporates a plurality of ferrite core, thin film-plated wire or planar thin film one-way transmission devices.

In accordance with a feature of this invention, there are provided a logical AND and NAND gate, each of which incorporates several ferrite core, thin film-plated wire or planar thin film one-way transmission arrangements. In view of the simple magnetic characteristics embodied in each of the abovementioned one-way transmission arrangements, AND and NAND gates can be readily fabricated therefrom to provide reliable logical circuits.

In accordance with another feature of this invention, a NAND gate may be simply obtained from an AND gate, which is fabricated from ferrite core, planar thin film or thin film, plated wire one-way transmission devices, by simply reversing their direction of magnetization.

The novel features that are considered characteristic of this invention are set forth with particularity in the appended claims. The invention itself, however, both as to its organization and method of operation, as well as additional objects and advantages thereof, will best be understood from the following description when considered in conjunction with the accompanying drawings, wherein:

FIGURE 3 is a schematic diagram showing another embodiment of a logical AND gate employing a plurality of thin film-plated wire one-way transmission devices;

FIGURE 4 is a schematic diagram showing a logical NAND gate utilizing a plurality of thin film-plated wire one-way transmission devices, which are magnetized oppositely from those of FIGURE 3;

FIGURE 5 is a schematic diagram showing a logical AND gate employing a plurality of planar thin film, one-way transmission devices;

FIGURE 6 is a schematic diagram showing a logical NAND gate employing a plurality of planar thin film one-way transmission devices, which are magnetized oppositely from those of FIGURE 5.

Figure 1:
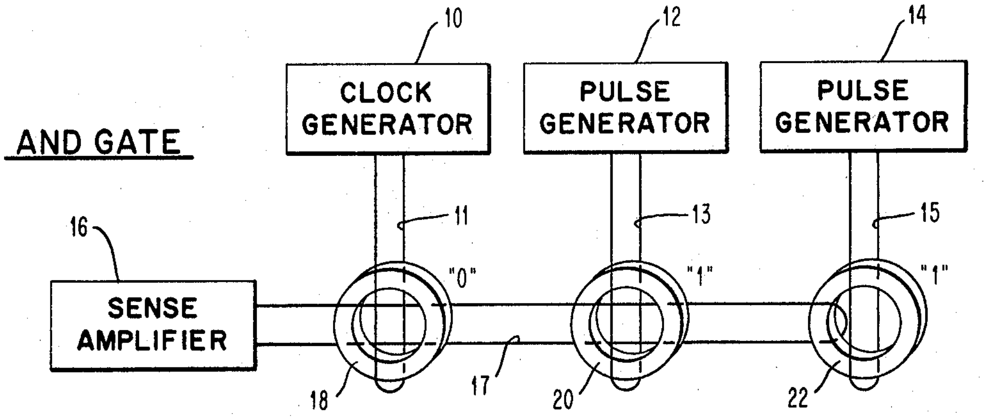
FIGURE 1 is a pictorial schematic showing a logical AND gate employing several ferrite core one-way transmission devices.

The instant invention provides a logical AND or NAND gate by arranging a plurality of ferrite core, thin film-plated wire or planar thin film one-way transmission devices in juxtaposition to one another. By way of background, a one-way transmission device of the thin film, plated wire arrangement, for example, comprises a drive line positioned substantially orthogonal to a plated wire upon which a thin magnetic film having a uniaxial anisotropy is formed (the plated wire also acts as a sense line). The above-described arrangement provides a strong nonreciprocal relationship (i.e., a signal from an energizing source which is applied to present the input terminal (drive line) will be transmitted to an output terminal (sense line), but a signal present on the sense line will not be retransmitted to the input terminal). The same one-way transmission characteristic may be obtained from a drive line in combination with a sense line for a planar, thin film or ferrite core arrangement. For the ferrite core one-way transmission system, the drive line is wound around without threading the core, whereas the sense line threads the hole thereof. Thus, as mentioned above, to provide a logical AND gate using the plated wire configuration, several drive lines consisting of metal straps, which are connected to respective energizing means, are arranged orthogonally to a plated wire sense line. The plated wire sense line is connected by conventional means to a sense amplifier or detector. At each bit position (i.e., the intersection of any drive line and a plated wire) the thin magnetic film is magnetized along the "easy" axis so that all but one of the bit positions are magnetized in the same direction. In other words, if one of the bit positions is magnetized as a binary "zero," then the remaining bit positions are magnetized as a binary "one."

The AND gate may, by way of example, consist of three one-way transmission devices of the plated wire type, wherein two bits are magnetized as binary "ones" and the remaining bit is magnetized as a binary "zero." The AND gate of this invention is designed to operate during clock time, and hence, the energizing means connected to the drive line contiguous to the odd bit position (i.e., the binary "zero") comprises a clock generator. The remaining drive lines are connected to conventional pulse generator devices. Assuming therefore that the magnetization vectors, which are oriented as binary "ones" will induce a negative signal in the sense line and the magnetization vectors oriented to provide a binary "zero" will induce a positive signal in the sense line, then the energizing of the two drive lines by their respective pulse generators and the simultaneous energizing of the drive line connected to the clock generator will produce a resultant negative signal (i.e., a double unit negative signal added to a single unit positive signal) which is detected by the sense amplifier. This signal is interpreted by a sense amplifier that the AND gate has been fully conditioned. On the other hand, if the clock generator and only one pulse generator simultaneously energize their respective drive lines, the resultant signal detected by the sense amplifier will be at zero or ground potential. The sense amplifier however is biased in such a manner so that it produces a positive output for a ground input potential. This positive output signal, as well as the postive output signal which is produced in response to a positive input potential from the clock generator, when energized alone, signifies that the AND gate has not been fully conditioned.

The NAND logical function, which provides phase inverted signals for the same input conditions as the AND gate, can readily be fabricated by employing the above-mentioned thin film-plated wire one-way transmission device. However, in order to derive the NAND logical function, the corresponding bit positions of the AND and NAND gates are magnetized oppositely. Thus, the bit position associated with the drive line connected to the clock generator is magnetized as a binary "one" and the remaining bit positions are magnetized as a binary "zero." Therefore, when the three generators are simultaneously energized, a resultant positive signal (i.e., a double unit positive signal added to a single unit negative signal) is induced in the plated wire sense line. The positive signal induced in the sense line by the energizing of all of the drive lines is interpreted by the sense amplifier as the execution of the logical NAND function. On the other hand, if the drive line associated with the clock generator and only one of the drive lines associated with a pulse generator are energized, a ground or zero potential would be received by the sense amplifier because the induced signals canel one another. However, the sense amplifier is biased in such a way so that the output signal for a zero potential input signal is of negative polarity (i.e., phase inverted for the same input conditions as the AND gate).

Referring now to the drawings, and in particular to FIGURE 1, and AND gate is depicted employing three ferrite core, one-way transmission devices, which are placed in juxtaposition to one another. The theory of operation of the ferrite core used as a one-way transmission device is explained in great detail in the co-pending U.S. patent application of Lester M. Spandorfer, Ser. Number 326,068, filed Nov. 26, 1963. The above application may be summarized by considering FIGURE 1 of the present application as follows: a sense winding 17 is threaded through the holes of the ferrite cores 18, 20 and 22, an is connected to an appropriate sense amplifier 16. The ferrite core transmission devices respectively incorporate drive lines 11, 13 and 15, each of which is arranged diametrically to its associated core without threading it. The drive windings 11, 13 and 15 are connected to respective pulse generators 10, 12 and 14. The pulse generator 10 comprises a clock generator and hence it is apparent that the AND gate disclosed by this invention is designed to only operate during clock time. The ferrite cores may be considered to be composed of tiny magnetic moments, which exist throughout the material. The magnetic moments of an individual core tend to be aligned in a common direction (i.e., either clockwise or counterclockwise) around the circumference of the core. Therefore, since the ferrite core 18 is magnetized as a binary "zero," the magnetic moments thereof will be oriented in the reverse direction from the magnetic moments of the ferrite cores 20 and 22, which are magnetized as binary "ones."

When the respective drive lines 11, 13 and 15 are momentarily energized by their respective pulse generators, the magnetic moments in the ferrite cores are slightly rotated to a position differing from their preferred position by the application of the orthogonal magnetizing force caused by the current in the drive lines. The application of the orthogonal magnetizing force causes the magnetic moments of the ferrite cores to complete their flux paths through the high reluctance air path. The creation of the air paths for the magnetic moments by the magnetizing force produces a net decrease in the magnetic flux in the core, and a voltage of fixed polarity is induced in the linking sense winding 17. The polarity of the induced voltage in the sense winding 17 is dependent upon the particular orientation of the magnetic moments around the ferrite cores. Thus, the ferrite core 18 associated with the clock generator is magnetized as a binary "zero" and induces a positive signal in the sense winding 17. The ferrite cores 20 and 22 associated with the pulse generators 12 and 14, respectively, have their magnetic moments magnetized as binary "ones" and hence, a negative signal is induced in the sense winding 17 when their drive lines are energized.

The AND and NAND logical gating function are demonstrated by means of the Truth Table below.

TRUTH TABLE

| | Inputs | | | Output | |
|---|---|---|---|---|---|
| | X (clock) | Y | Z | AND | NAND |
| (a) | 1 | 0 | 0 | 0 (pos.) | 1 (neg.) |
| (b) | 1 | 1 | 0 | 0 (pos.) | 1 (neg.) |
| (c) | 1 | 0 | 1 | 0 (pos.) | 1 (neg.) |
| (d) | 1 | 1 | 1 | 1 (neg.) | 0 (pos.) |

The Truth Table or table of combinations above has been tabulated for three input signals, namely X, Y and Z wherein the X signal comprises a clock pulse. A zero or a one in any input column indicates the absence or the presence, respectively, of an input signal. The "one" in the X column merely indicates that the clock pulse is present under all conditions from (a) to (d). The AND function performs logical multiplication and hence, the "zero" or the "one" in the output column for the AND gate indicates the non-gating or gating, respectively, of the input signal. It should be noted that the column under the NAND function is directly opposite or phase inverted from the AND function for the same input conditions delineated in lines (a), (b), (c) and (d) of the Truth Table. The Truth Table will be discussed in more detail below. It should be noted that the "zero" and "one" binary conditions set forth in the output columns of the Truth Table are not the same as the "zero" (i.e., absence of a signal) and a "one" (i.e., presence of a signal) under the input columns.

The conditions set forth on line (a) of the Truth Table indicates that the AND gate is not permissed (the "0" in the output column) if neither of the pulse generators 12 and 14 energize their respective drive lines 13 and 15. However, since the drive line, which is connected to the clock generator is energized during clock time, a positive signal will be induced in the sense line 17 at this time. This positive signal, which is detected by the sense amplifier 16 is interpreted by the latter as indicating that the AND gate is not fully conditioned.

Lines (b) and (c) of the Truth Table represent the energizing of the drive line 11 by the clock generator 10 and either the drive line 13 or 15 by their respective pulse generators 12 or 14. Since the bit position associated with the clock generator 10 and the bit positions associated with either the pulse generators 12 or 14 are magnetized oppositely, it is clear that the resultant signal detected by the sense amplifier 16 will be of zero amplitude and is interpreted by the sense amplifier as the non-permissing of the AND gate. The sense amplifier, however, is biased in such a way in accordance with the techniques of those skilled in the art that the zero or ground input signal produces a positive output voltage in accordance with the polarity indicated in lines (b) and (c) of the Truth Table.

It should be noted that when a signal is induced on the sense line, there are no sneak paths or back circuits to other input lines which is a very desirable feature in logic circuitry. This results from the fact that the one-way transmission device of this invention exhibits a strong non-reciprocal relationship. Thus, when two inputs are in the quiescent state and one input is energized in a logical AND circuit having a fan-in of three, current cannot be transferred from the energized drive line (input) to the other two via the magnetic paths between the sense line and the two drive lines since in fact magnetic coupling is non-existent. While the present invention does provide non-reciprocal signal transmission, it should be noted that it functions in a manner which is analogous to present non-reciprocal signal transmission arrangements when more than one input line is energized simultaneously. That is to say, if two lines are energized simultaneously, less current flows on each line than would flow if only one line were energized thus in effect slightly reducing the non-reciprocity.

The gating conditions set forth on line (d) of the Truth Table are obtained by the simultaneous energizing of the drive lines 11, 13 and 15. Thus, the AND gate of FIGURE 1 is permissed when the last mentioned drive lines are energized since a positive signal is induced in the sense line 17 by the energizing of the drive line 11, and a double amplitude negative signal is induced in the sense line 17 by the energizing of drive lines 13 and 15 there results a net negative signal in line 17. The resultant signal therefore detected by the sense amplifier 16 is negative and is received and interpreted by the latter as the permissing of the AND gate. In other words, the permissing of the AND gate (which is indicated by a "one" in the output column of the Truth Table), provides a negative signal to the sense amplifier 16.

Figure 2:
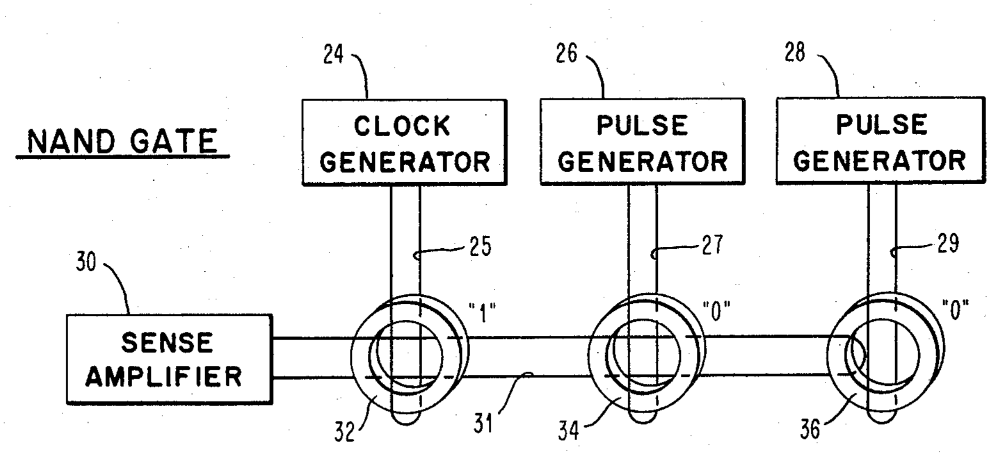
FIGURE 2 is a pictorial schematic showing a logical NAND gate utilizing ferrite core one-way transmission devices, which are magnetized oppositely from those of FIGURE 1.

The NAND gate provided by this invention is depicted in FIGURE 2. As is understood, the logical NAND gate provides a phase inverted output for the same AND gate combination of input signals as indicated in the X, Y and Z columns of the Truth Table. Therefore, the output column of the Truth Table indicates that whenever the AND gate registers a "zero" (positive polarity), the NAND gate output is correspondingly a "one" (negative polarity). As can be readily observed from FIGURE 2, the NAND gate is constructed similarly to the AND gate of FIGURE 1. Thus, three one-way transmission devices consisting of the ferrite cores 32, 34 and 36 are threaded by a common sense line 31, which is connected to a sense amplifier 30. Each ferrite core one-way transmission device has an individual drive element 25, 27 and 29, which diametrically encircles each core without being threaded therethrough. The drive line 25 is connected to the clock generator 24, whereas the drive lines 27 and 29 are connected to conventional pulse generators 26 and 28. The only substantial difference between the AND gate of FIGURE 1 and the NAND gate of FIGURE 2 is that the ferrite cores associated with the NAND gate of FIGURE 2 are magentized oppositely from the corresponding ferrite cores in the AND gate. Thus, ferrite core 32 is magnetized as a binary "one," and ferrite cores 34 and 36 are magnetized as binary "zeros."

Referring again to the Truth Table and particularly to line (a) thereof, it is apparent that during clock time when the clock generator 24 energizes drive line 25, a negative signal is induced in the sense line 31. It should be noted that the signal induced in the sense line 31 by the clock generator 24 is phase inverted from the signal induced in the sense line 17 by the clock generator 10. Similarly, lines (b) and (c) of the Truth Table indicate that for the same input signals applied to the AND gate, the NAND gate will provide a phase inverted signal. In order to establish this phase inverted signal, the sense amplifier 30 is biased differently from the sense amplifier 16. As discussed above, a zero or ground potential input signal to the sense amplifier 16 produced a positive output signal. The sense amplifier 30 is biased so that a ground potential input signal produces a negative output signal. A zero input signal is received by the sense amplifier 30 when the clock pulse generator 24 energizes the drive line 25 and at the same time either of the pulse generators 26 or 28 energizes its respective drive line 27 and 29 because the two induced signals (i.e., a negative and a positive) cancel one another.

Line (d) of the Truth Table sets forth the required parameters for the execution of the NAND logical function. Thus, as indicated therein, each drive line 25, 27 and 29 (inputs X, Y, Z) is simultaneously energized by their respective energizing means 24, 26 and 28. When the clock generator 24 energizes the drive line 25 a negative signal is induced in the sense winding 31. On the other hand, when the pulse generators 26 and 28 simultaneously energize the respective drive lines 27 and 29, a positive signal whose amplitude is double that of the negative signal is induced in the sense line 31. A resultant positive signal is therefore detected by the sense amplifier 30, which is interpreted thereby as fully conditioning the gate. As is apparent by inspection the positive signal represented by the "zero" in the NAND gate output column of the Truth Table is phase inverted from the negative signal represented by the "one" in the AND output column.

The AND and NAND gates of FIGURES 3 and 4 operate in a similar manner to that just described with regard to FIGURES 1 and 2 and differ therefrom only with respect to the use of different unilateral conducting devices. Thus, the one-way transmission device used to fabricate the AND and NAND gates of FIGURES 3 and 4 is a thin film-plated wire arrangement. The thin film-plated wire, one way transmission device is explained in greater detail in my previously mentioned, co-pending application. Summarizing the pertinent facts therein relating to plated wires, it may be stated that the thin film-plated wire device is typically a five mil diameter beryllium copper wire substrate having a thin magnetic film formed on the surface thereof. The thin film, which is nickel-iron alloy (Permalloy), is electroplated on the wire surface with a thickness of 10,000 Angstroms. The Permalloy coating is electroplated in the presence of the circumferential magnetic field that establishes a uniaxial anisotropy axis at right angles (i.e., around the circumference) to the length of the wire. The uniaxial anisotropy establishes an "easy" and "hard" direction of magnetization and the magnetization vectors of the thin film are normally oriented in one of two equilibrium positions along the "easy" axis, thereby establishing two bistable states necessary for binary logic operation. The plated wires 44 and 60, which act as sense lines during operation are connected by an appropriate means to respective sense amplifiers 52 and 62. One end of the sense lines are grounded and the other ends are returned to ground via the respective sense amplifiers.

Placed substantially perpendicular and in juxtaposition to the sense lines are a plurality of drive lines. The AND gate in FIGURE 3 depicts the drive lines 38, 40 and 42, which are respectively connected to the pulse generators 46, 48 and 50, as orthogonally positioned to the sense line 44. In like manner, the NAND gate of FIGURE 4 shows the drive lines 54, 56 and 58, which are connected to their respective pulse generators 60, 62 and 64, as positioned orthogonally to the sense line 60. It should be noted that the magnetization at each of the bit positions (i.e., the intersection of any drive line and the line) is the same as that used with respect to the AND gate of FIGURE 1 and the NAND gate of FIGURE 2. Therefore, the bit position associated with the clock generator for the AND gate of FIGURE 3 is magnetized at the "easy" axis of a binary "zero" and the remaining bit positions are magnetized around the "easy" axis as binary "ones." Furthermore, the bit position associated with the clock generator 60 of the NAND gate of FIGURE 4 is magnetized around the "easy" axis as a binary "one," whereas the remaining bit positions are magnetized as binary "zeros."

In all other respects, the AND and NAND gates of FIGURES 3 and 4 operate in a similar manner to the operation of the corresponding gates of FIGURES 1 and 2. In other words, the permissing or non-permissing of the AND and NAND gates is achieved in accordance with the input signals set up in the Truth Table. Furthermore, as in the case with the ferrite core one-way transmission device, the plate wire exhibits a strong non-reciprocal relationship (i.e., when a signal is induced in the sense line, there are no sneak paths or back circuits to other input lines).

The AND and NAND gates of FIGURES 5 and 6, respectively, are fabricated and operate in a similar manner to the AND and NAND gates described with respect to FIGURES 1 and 2 as well as FIGURES 3 and 4. The only distinction between the AND and NAND gates of FIGURES 5 and 6 and that of FIGURES 3 and 4 is that the one-way transmission device used to fabricate these gates is of the planar, thin film type. The planar, thin film one-way transmission device used in FIGURES 5 and 6 is described in greater detail in my above mentioned co-pending application. Briefly, it may be stated that the thin film spots depicted in FIGURES 5 and 6 are a thin, Permalloy film whose thickness is anywhere from 500 to 10,000 angstroms which are deposited by evaporation or electrodeposition on a substrate material 39 and 41 such as glass. The thin film spots are deposited in the presence of a magnetic field, which establish both the "easy" and "hard" direction of magnetization. After the thin film spots have been deposited, a small width overlay 43 and 45 are positioned over the top thereof and are connected by appropriate means to their respective sense amplifiers 70 and 71. Placed over the top of the thin film spots and substantially perpendicular to the sense line overlay are the drive elements. Thus, the AND gate of FIGURE 5 shows the drive lines 47 and 49 and 51, which are connected to respective pulse generators 59, 61 and 63, positioned substantially perpendicular to the sense line overlay 43. In like manner, the drive lines 53, 55 and 57, which are connected to respective pulse generators 65, 67 and 69, are positioned perpendicular to the sense line 45 which is connected to the sense amplifier 71. It should be again noted that the pulse generators 59 and 65 are of the clock type. Furthermore, it is apparent by inspection that the magnetization polarities of the thin film spots along the "easy" axis are similar to those described with respect to the AND gate of FIGURE 1 and the NAND gate of FIGURE 2. In all other respects, the AND gate and the NAND gate of FIGURES 5 and 6 respectively, operate in a similar manner and include the same characteristics of the AND gate of FIGURE 3 and the NAND gate of FIGURE 4.

While the AND and NAND logic circuits of the instant invention have been described with a fan-in of three, it should be understood that a logic circuit having a fan-in of greater than three can be simply provided. For example, the sense amplifier 16 (FIGURE 1) may be biased, for any fan-in, by providing a positive voltage whose absolute magnitude is equal to the absolute value of the negative voltage produced by the total number of drive lines less the absolute value of two of the drive lines associated with the binary "one" magnetization. Another method of compensating for additional fan-in would be to provide one less bias drive line than the total information drive lines, (i.e., one less bias line such as line 11 than the total information lines, such as lines 13 and 15). The other embodiments depicted in the remaining figures would be similarly designed taking cognizance of the polarities required.

In summary, the instant invention provides an AND and NAND gate, which incorporates ferrite core, thin film-plated wire or planar thin film one-way transmission devices. The bit positions associated with the one-way transmission devices comprising the AND gate are arranged so that all but one of the transmission devices are magnetized in the same direction. On the other hand, the corresponding bit positions of the one-way transmission devices for a NAND circuit are magnetized oppositely from the AND gate. The AND and NAND gates of this invention only operate during a clock period and hence, the gates will be permissed if all the inputs are simultaneously energized during clock time. It should be noted that the AND and NAND gates described above are not necessarily intended to be connected to one another in a logical chain, but rather are intended to be used as separate circuit elements. This is not to say however that the AND and NAND gates of this invention could not be so combined as by the use of specialized sense amplifiers.

Obviously, many modifications and variations of the present invention are possible in the light of the above teachings. It is therefore to be understood that within the scope of the appended claims, the invention may be practiced otherwise than as specifically described.

The embodiments of the invention in which an exclusive property or privilege is claimed are defined as follows:

1. A logic circuit comprising: a plurality of first flux generator means continually providing a respective first flux in either a first or second direction, one of said plurality of first generator means providing a first flux in said first direction, the remainder of said plurality of first generator means providing said first flux in said second direction; sense means positioned contiguous to said plurality of first flux generator means and disposed both substantially orthogonal to and so as to be linked by said first flux, said sense means adapted to be connected to a sense amplifier; plurality of second flux generator means adapted to be connected to respective energizing means, one of said respective energizing means comprising a clocking means, which applies a continuous pulse signal to said second flux generator means, each said second flux generator means being positioned substantially orthogonal to said sense means, said second flux generator means which is adapted to be connected to said clocking means being positioned contiguous to said first flux generator means which provides said first flux in said first direction, the remainder of said plurality of second flux generator means being respectively positioned contiguous to associated ones of said first flux generator means which provide said first flux in said second direction, any one or several of said plurality of second flux generator means including at least said second flux generator which is adapted to be connected to said clocking means, when energized by said respective energizing means to accomplish logical functions, producing respective second fluxes, which second fluxes are applied in a direction orthogonal to said respective first fluxes thereby rotating said first fluxes to produce a current and voltage in said sense means which current and voltage is detected by said sense amplifier, said current in said sense means producing a third flux which is parallel to said plurality of said second flux generator means, and therefore being substantially decoupled from said second flux generator means.

2. A logic circuit in accordance with claim 1 wherein said first flux generator means comprises a thin magnetic film, having a uniaxial anisotropy establishing an "easy" direction for magnetization vectors, formed on the surface of a wire substrate.

3. A logic circuit in accordance with claim 1 wherein said first flux generator means comprises a thin magnetic film spot formed on a planar substrate material, said thin film spot incorporating a uniaxial anisotropy establishing an "easy" direction of magnetization.

4. A logic circuit in accordance with claim 1 wherein said first flux generator means comprises a ferrite core.

5. A logic circuit comprising: a plurality of first flux generator means continually providing a respective first flux in either a first or second direction, one of said plurality of first generator means providing a first flux in said first direction, the remainder of said plurality of first generator means providing said first flux in said second direction; sense means positioned contiguous to said plurality of first flux generator means and disposed both substantially orthogonal to and so as to be linked by said first flux, said sense means adapted to be connected to a sense amplifier; a plurality of second flux generator means adapted to be connected to respective energizing means, one of said respective energizing means comprising a clocking means which applies a continuous pulse signal to said second flux generator means, each said second flux generator means being positioned substantially orthogonal to said sense means, said second flux generator which is adapted to be connected to said clocking means being positioned contiguous to said first flux generator means which provides said first flux in said first direction, the remainder of said plurality of first flux generator means being positioned contiguous to said first flux generator means which provides said first flux in said second direction, an AND circuit being conditioned when all of said plurality of second flux generator means are simultaneously energized by said respective energizing means including said clocking means to produce respective second fluxes, said respective second fluxes being applied in a direction orthogonal to said respective first fluxes thereby rotating said respective first fluxes to produce individual currents and voltages which combine to provide a first current and first voltage in said sense means which is detected by said sense amplifier, said first currents in said sense means producing third fluxes which are parallel to said plurality of said second flux generator means, said third fluxes being substantially decoupled from said second flux generator means.

6. A logical circuit in accordance with claim 5 wherein said first generator means comprises a thin magnetic film, having a uniaxial anisotropy establishing an "easy" direction of magnetization.

7. A logical circuit in accordance with claim 5 wherein said first generator means comprises a thin magnetic film spot formed on a planar substrate, said thin film spot incorporating a uniaxial anisotropy establishing an "easy" direction of magnetization.

8. A logical circuit in accordance with claim 5 wherein said first generator means comprises a ferrite core.

9. A logic circuit in accordance with claim 5 wherein when said plurality of second flux generator means is four or greater, said sense amplifier is biased with a voltage which is opposite in polarity to first voltage and whose magnitude is equal to the combined individual voltages produced in said sense means by the number of second flux generator means, associated with said first flux generator means which provides said first flux in a second direction, less two of said individual voltages.

10. A logical circuit in accordance with claim 5 wherein one of said plurality of first flux generating means provides said first flux in said second direction, the remainder of said plurality of first flux generator means providing said first flux in said first direction, to effect a change of polarity of the current and voltage produced in said sense line from that of said first current and said first voltage, thereby conditioning a NAND device.

References Cited

UNITED STATES PATENTS 2,815,488 12/1957 Von Neumann ------- 332—52

OTHER REFERENCES

Bradley, E. M., "Properties of Magnetic Films for Memory System," Journal of Applied Physics Suppl. to vol. 33, No. 3, pp. 1051–1056, March 1962.

Bittmann, E. C., "Using Thin Films in High Speed Memories," Electronics, June 5, 1959, pp. 55–57.

Tillman, R. M., "Fluxlok, a Nondestructive Random Access Electrically Alterable, High-Speed Memory Technique Using Standard Ferrite Memory Cores," IRE Transactions on Electronic Computers, September 1960, pp. 323–328.

TERRELL W. FEARS, *Primary Examiner.*

R. MORGANSTERN, *Assistant Examiner.*